United States Patent
Rathinasabapathi

(10) Patent No.: US 12,157,086 B1
(45) Date of Patent: Dec. 3, 2024

(54) AMINE LIQUID SEAL IN A FLARE SYSTEM

(71) Applicant: KUWAIT NATIONAL PETROLEUM COMPANY, Safat (KW)

(72) Inventor: Kanagasabai Rathinasabapathi, Safat (KW)

(73) Assignee: KUWAIT NATIONAL PETROLEUM COMPANY, Safat (KW)

( * ) Notice: Subject to any disclaimer, the term of this patent is extended or adjusted under 35 U.S.C. 154(b) by 0 days.

(21) Appl. No.: 18/217,910

(22) Filed: Jul. 3, 2023

(51) Int. Cl.
| | | |
|---|---|---|
| *B01D 53/14* | (2006.01) | |
| *B01D 53/18* | (2006.01) | |
| *B01D 53/52* | (2006.01) | |
| *B01D 53/78* | (2006.01) | |
| *B01D 53/96* | (2006.01) | |

(52) U.S. Cl.
CPC ..... *B01D 53/1468* (2013.01); *B01D 53/1425* (2013.01); *B01D 53/1493* (2013.01); *B01D 53/185* (2013.01); *B01D 53/52* (2013.01); *B01D 53/78* (2013.01); *B01D 53/96* (2013.01); *B01D 2252/204* (2013.01); *B01D 2257/304* (2013.01)

(58) Field of Classification Search
CPC ............ B01D 53/1468; B01D 53/1425; B01D 53/1493; B01D 53/185; B01D 53/52; B01D 53/78; B01D 53/96; B01D 2252/204
USPC ....................................................... 423/229
See application file for complete search history.

(56) References Cited

U.S. PATENT DOCUMENTS

| | | | | |
|---|---|---|---|---|
| 4,844,844 A | * | 7/1989 | Levy | ...................... F23G 7/085 137/251.1 |
| 2007/0157806 A1 | | 7/2007 | Cash et al. | |
| 2019/0022580 A1 | | 1/2019 | Al Muhsen | |
| 2019/0314755 A1 | | 10/2019 | Al Muhsen | |
| 2021/0008497 A1 | | 1/2021 | Al Muhsen | |

FOREIGN PATENT DOCUMENTS

JP     H08303740 A    * 11/1996

OTHER PUBLICATIONS

JPH08303740A—English translation (Year: 1996).*
Applied Analytics, Lean Amine / Rich Amine Analysis (available online Aug. 10, 2020—Internet Archive Wayback Machine).

* cited by examiner

*Primary Examiner* — Anita Nassiri-Motlagh
(74) *Attorney, Agent, or Firm* — Nath, Goldberg & Meyer; Joshua B. Goldberg

(57) ABSTRACT

A flare seal drum having an amine liquid seal. The flare seal drum includes: a baffle separating the flare seal drum into a first section and a second section; a waste gas inlet receiving waste gas into the first section and being combined with amine in the first section; a gas collecting pipe located in the first section; a packing pipe receiving waste gas from the gas collecting pipe; a packing filling the packing pipe, the waste gas passing through the packing; an amine spray nozzle located above the packing pipe and supplying amine to the packing in the packing pipe; and an amine pump that removes amine and waste gas from the second section through an amine line.

17 Claims, 2 Drawing Sheets

AMINE SEAL DRUM WITH AMINE BED

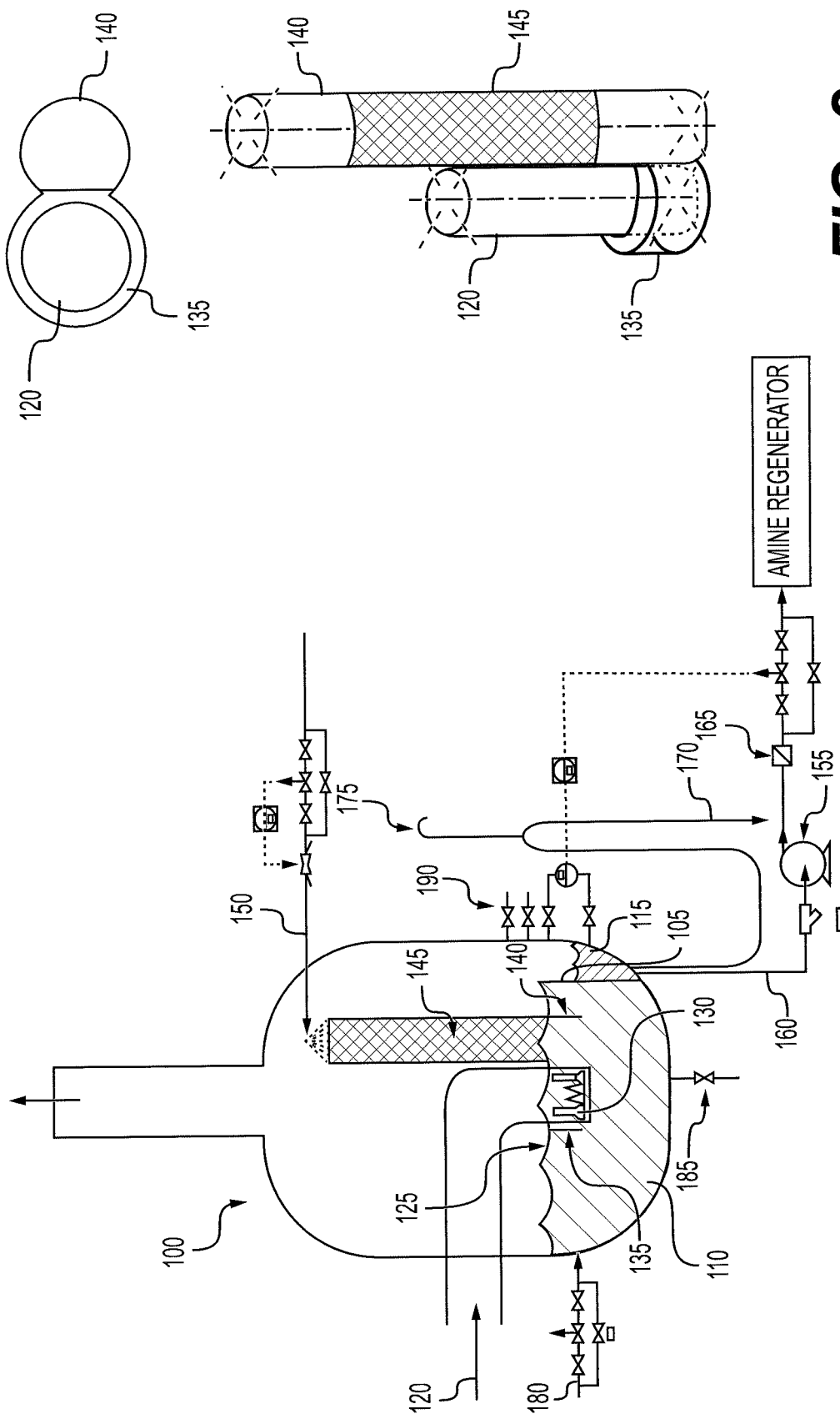

AMINE LIQUID SEAL IN A FLARE SYSTEM

BACKGROUND

1. Field

The present disclosure relates to flare and vent stacks, and particularly to a flaring system and method to remove waste gas.

2. Description of the Related Art

Flare and vent stacks are commonly used in the petroleum, chemical and petrochemical industry to dispose of combustible gases and hydrogen sulfide, which are released to protect the plant and operating personnel. These stacks are frequently provided with a water or liquid seal through which the gases are passed.

The purpose of the liquid seal includes preventing flame flashback and the maintenance of an above atmospheric pressure in the flare line. Positive atmospheric pressure is required to prevent any possibility of air entering the flare line. Normally, two drums are located in the flare, one being a flare knockout drum to remove any liquid hydrocarbon and water, the other being a water seal drum to prevent any negative pressure in the flare header.

In more detail, flaring systems are thus employed for flaring combustible gaseous materials, and burning of gaseous hydrocarbon material where such materials are derived from operations of the refining of petroleum oils in various industrial operations, in which large volumes of combustible gaseous/hydrogen sulfide materials are produced. Materials resulting from upset conditions in the normal operation of a refinery, wherein gases which ordinarily might be subjected to further processing in order to obtain valuable products therefrom, must be vented in order to avoid the occurrence of dangerously abnormal pressures.

These gases cannot be discharged to the atmosphere due to their high volume and presence of poisonous gases like hydrogen sulfide ($H_2S$). It is normal practice to burn such gases as they are discharged from an exhaust or flare stack at a considerable height above the ground.

Seal drums prevent flashback and thus avoid explosive situations. The flare systems thus commonly installed at refineries and petrochemical plants must be capable of smoothly carrying off the sudden waste gas surges occurring during operating disturbances and in emergencies.

A flare system of the type described generally includes a collecting line or inlet line, in which the gases to be flared are passed by way of a water or liquid-containing drum connected to the flare, which is designed as a high stack and/or at ground level and from which the gases can be flared in so far as they are combustible. The liquid used may be water or, if required, a glycol/water mixture. Such flare gas recovery systems are commonly used to enable recovery of hydrocarbon gases that would otherwise be flared. However, when using such currently known systems, pollutants in the flare gas, such as hydrogen sulfide, are typically burnt at the flare tip, resulting in significant sulfur oxide emissions.

Thus, it would be desirable to develop a flare system and method to remove waste gas therefrom solving the aforementioned problems.

SUMMARY

The present subject matter relates to a flare system that reduces pollution and includes a flare seal drum containing amine that is maintained at a predetermined level. The present system can reduce the pollution from a flare and comprises a flare seal drum containing amine/water sprayed and maintained at a predetermined level and a waste gas. This amine seal drum can give one theoretical stage of separation, through a small structured packed bed that can improve the absorption of flare gas contaminants, such as hydrogen sulfide ($H_2S$) and result in lower emissions of pollutants.

According to the present system, inlets conduit can be modified to send normal flow through a structured pack bed, whereby gases discharged from the inlet conduit pass through the packed bed before finally discharging from the drum to a flare stack. This system can enable the reduction of sulfur oxide emissions by 80% for normal operations.

In an embodiment of the present subject matter, a waste gas is received in the flare seal drum and flows into a packed bed, which is sprayed with amine. This amine seal drum, as described, can give one theoretical stage of separation, through the packed bed that can improve the absorption of flare gas contaminants, such as $H_2S$, and result in lower emissions of pollutants.

A flare seal drum having an amine liquid seal, in one embodiment, includes: a baffle separating the flare seal drum into a first section and a second section; a waste gas inlet receiving waste gas into the first section and being combined with amine in the first section; a gas collecting pipe located in the first section; a packing pipe receiving waste gas from the gas collecting pipe; a packing filling the packing pipe, the waste gas passing through the packing; an amine spray nozzle located above the packing pipe and supplying amine to the packing in the packing pipe; and an amine pump that removes amine and waste gas from the second section through an amine line.

The flare seal drum can further include an inlet supplying amine to the first section.

The flare system drum can also include a plurality of slots surrounding the gas collecting pipe.

The flare seal drum, in some instances, includes a siphon located in the second section that drains amine from the second section.

In other instances, the flare seal drum includes a filter in the amine line that removes solid particles.

The flare seal drum can further include an amine regenerator in the amine line that removes waste gas and recycles the amine.

In an embodiment, the height of the packing can be equivalent to four theoretical plates, or about 40 cm.

In another embodiment, the present subject matter relates to a flare system method for a flare seal drum split into a first section and a second section, comprising: receiving waste gas in the first section from a waste gas inlet so that the waste gas combines with amine; collecting the waste gas in a gas collecting pipe located in the first section; allowing the waste gas in the gas collecting pipe to flow to a packing pipe filled with a packing, the waste gas passing through the packing; spraying the packing with amine from an amine spray nozzle located above the packing pipe; and removing amine and waste gas from the second section through an amine line using an amine pump.

The methods can further include supplying amine to the first section through an inlet.

The methods can also include collecting the waste gas through a plurality of slots surrounding the gas collection pipe.

In other embodiments, the methods can include draining amine from the second section with a siphon located in the second section.

Alternatively, the methods can include removing solid particles from the amine line with a filter.

The methods can also include removing waste gas and recycling amine in the amine line with an amine regenerator.

In an embodiment, the height of the packing can be equivalent to four theoretical plates, or be about 40 cm.

These and other features of the present subject matter will become readily apparent upon further review of the following specification.

BRIEF DESCRIPTION OF THE DRAWINGS

FIG. 1 is an illustration of a flare seal drum having an amine liquid seal.

FIG. 2 is plain view and cross section view of an inlet line and packing pipe for a flare seal drum.

Similar reference characters denote corresponding features consistently throughout the attached drawings.

DETAILED DESCRIPTION OF THE PREFERRED EMBODIMENTS

Figure 3:
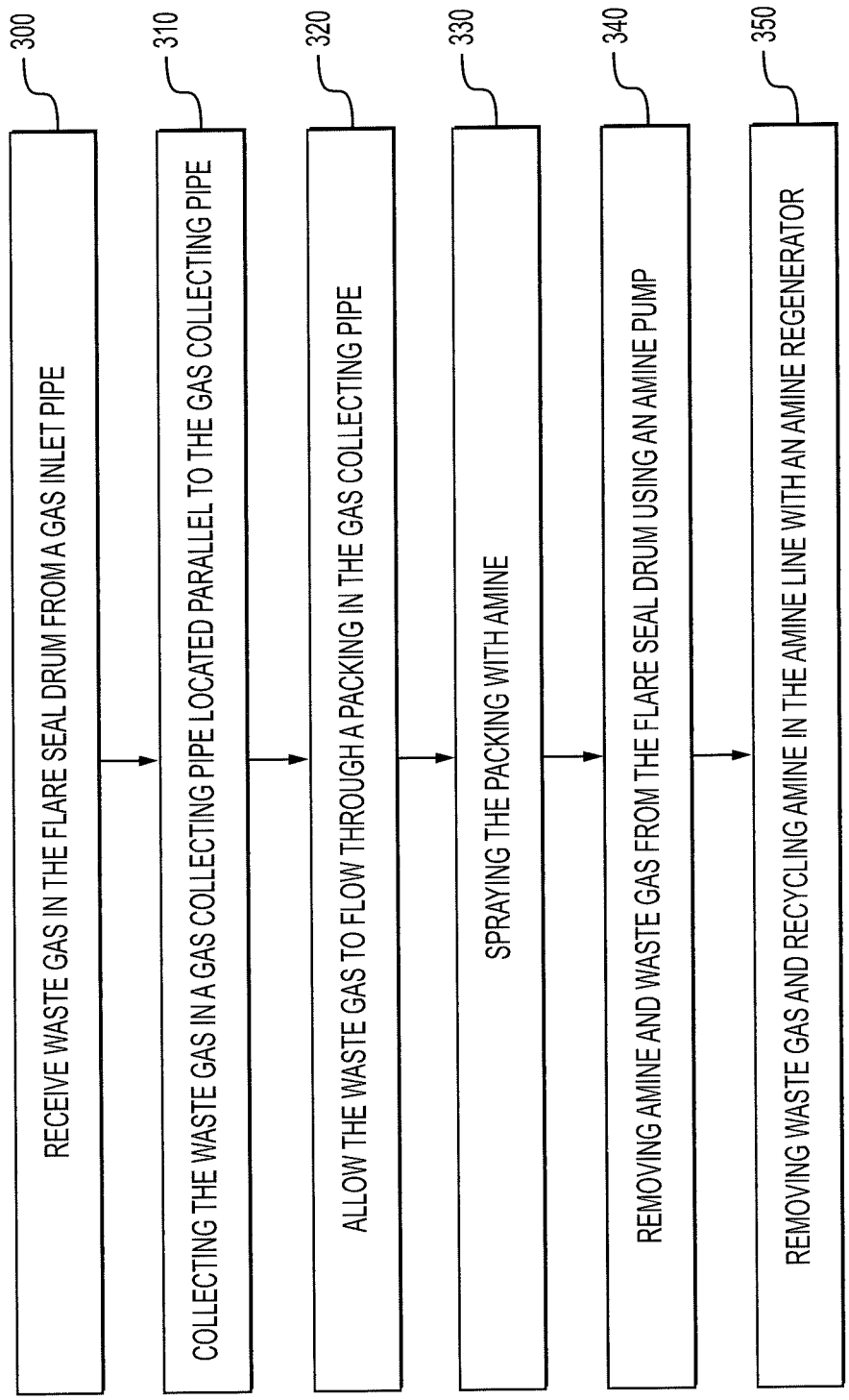
FIG. 3 is a flow diagram of a flare system method.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a flare system that reduces pollution and includes a flare seal drum containing amine that is maintained at a predetermined level. The present system can reduce the pollution from a flare and comprises a flare seal drum containing amine/water sprayed and maintained at a predetermined level and a waste gas. This amine seal drum can give one theoretical stage of separation, through a small structured packed bed that can improve the absorption of flare gas contaminants, such as hydrogen sulfide ($H_2S$), and result in lower emissions of pollutants.

According to the present system, inlets conduit can be modified to send normal flow through a structured pack bed, whereby gases discharged from the inlet conduit pass through the packed bed before finally discharging from the drum to a flare stack. This system can enable the reduction of sulfur oxide emissions by 80% for normal operations.

In an embodiment of the present subject matter, a waste gas is received in the flare seal drum and flows into a packed bed, which is sprayed with amine. This amine seal drum, as described, can give one theoretical stage of separation, through the packed bed that can improve the absorption of flare gas contaminants, such as $H_2S$, and result in lower emissions of pollutants.

A flare seal drum having an amine liquid seal, in one embodiment, includes: a baffle separating the flare seal drum into a first section and a second section; a waste gas inlet receiving waste gas into the first section and being combined with amine in the first section; a gas collecting pipe located in the first section; a packing pipe receiving waste gas from the gas collecting pipe; a packing filling the packing pipe, the waste gas passing through the packing; an amine spray nozzle located above the packing pipe and supplying amine to the packing in the packing pipe; and an amine pump that removes amine and waste gas from the second section through an amine line.

Accordingly, the present subject matter is directed to flare stacks having a liquid seal through which gasses pass. The purpose of the liquid seal includes preventing flame flashback, and maintaining an above atmospheric pressure in the flare line. Positive atmospheric pressure is required to prevent any possibility of air entering the flare line. Two drums are located in the flare. One of the drums is a flare knockout drum to remove any liquid hydrocarbon and water. The other drum is a liquid seal drum to prevent any negative pressure in the flare header.

The present flaring system can be employed for flaring combustible gaseous materials, and burning of gaseous hydrocarbon material. These gases are derived from the refining of petroleum oils in various industrial operations, in which large volumes of combustible gaseous/hydrogen sulfide materials are produced. Byproducts that result from the normal operation of a refinery, wherein gases which ordinarily might be subjected to further processing in order to obtain valuable products therefrom, must be vented in order to avoid the occurrence of dangerously abnormal pressures.

These gases cannot be discharged to the atmosphere due to the high volume and presence of poisonous gases like hydrogen sulfide ($H_2S$). The gasses, in some instances, can be burned as they are discharged from an exhaust or flare stack at a considerable height above the ground.

Seal drums prevent flashback and thus avoid explosive situations. Flare systems installed at refineries and petrochemical plants must be capable of smoothly carrying off the sudden waste gas surges occurring during operating disturbances and in emergencies.

A flare system of the type described includes a collecting line or inlet line in which the gases to be flared are passed by way of a liquid-containing drum connected to the flare, which is designed as a high stack and/or at ground level from which the gases can be flared in so far as they are combustible.

The flare seal system can use amine (including, by way of non-limiting example, monoethanolamine (MEA), diethanolamine (DEA), methyl diethanolamine (MDEA), diisopropanolamine (DIPA), or any combination thereof) as the liquid. Waste gas can enter the seal drum through a waste gas inlet pipe and come into contact with the amine. Some of the $H_2S$ can be absorbed, however it is limited to one theoretical tray.

In order to improve the mass transfer, a column can be installed parallel to the waste gas inlet pipe. The column can be filled with structured packing and amine can be sprayed on the top of the packing. Gas from the inlet pipe can be routed through a circumferential annular space between the inlet pipe and a new pipe. Each pipe can be open completely in the bottom. Gases can enter through the bed and meet the amine falling from the top. Most of the $H_2S$ can be absorbed in the amine. This amine can be pumped to an amine regenerator through filters. The amine regenerator can remove the $H_2S$, and lean regenerated amine can then be returned to the seal drum. Filters can be provided to remove pyrophoric particles.

A flare seal system containing amine can reduce the pollution from the flare. The system can operate using a flare seal drum containing amine that is sprayed and maintained at a predetermined level. This amine seal drum can give one theoretical stage of separation, through a small structured packed bed that can improve the absorption of flare gas contaminants, such as $H_2S$ and result in lower emissions of pollutants.

An inlet conduit as per API can send a normal flow of waste gas through a structured packed bed, whereby, gases discharging from the inlet conduit pass through the packed bed before finally discharging from the drum to a flare stack.

The improvement can enable the reduction of sulfur oxide emissions, for example, by about 80%, for normal operations. Other reductions of sulfur oxide emissions may likewise be possible including, for example, a more than 80% reduction of sulfur oxide emissions.

FIG. 1 is an illustration of a flare seal drum 100 having an amine liquid seal. A baffle 105 separates the flare seal drum 100 into a first section 110 and a second section 115. Waste gas enters through inlet line 120. The amine level is maintained at a level 125. Gases from the inlet line 120 pass through the slots 130 to the circular collector pipe 135 (gas collecting pipe) surrounded by slots 130. Collected gas passes through to packing pipe 140 and packing 145, and stays in contact with amine coming from the amine spray nozzle 150. The height of the packing 145 is defined as being equivalent to four theoretical plates, and the pressure drop will be equivalent to the seal. The amine level in the drum 100 is maintained by puffing lean amine into the bed to maintain the seal. Excess amine falls onto the other side of the baffle (e.g. the second section 115). Amine pump 155 removes rich amine from the seal drum through the line 160 along with $H_2S$. Two filters 165 are installed to remove any solid particles and reduce contamination. An amine level controller will maintain the amine level in the seal drum. $H_2S$ will be removed in the amine regenerator, and amine will be recycled back as lean amine for absorption back into the system (i.e., amine spray nozzle 150). In case of any failure in the level control system or any other cause of creating a high level, excess amine is automatically drained by a siphon 170 having a vent 175. An inlet 180 supplies amine to the first section 110, which is also provided with a drain 185. The inlet 180 can receive lean amine from the amine regenerator. A manual check valve 190 is used to check the level of amine using a level troll.

FIG. 2 is a plan view and cross section view of inlet line 120 and packing pipe 140. The inlet line 120 is surrounded by circular collector pipe 135. The packing pipe 140 is parallel to the inlet line 120, and is filled with a packing 145.

FIG. 3 is a flow diagram of a flare system method. In box 300, waste gas is received in the flare system drum from a gas collecting pipe. The waste gas, in box 310, is collected in a gas collecting pipe located parallel to the gas inlet pipe. In box 320, the waste gas flows through a packing in the gas collecting pipe. The packing is then sprayed, in step 330, with amine from an amine spray nozzle located above the packing pipe. In step 340, amine and waste is removed from the flare system drum through an amine line using an amine pump. The waste gas, in step 350, is removed from the amine line with an amine regenerator, which also recycles the amine.

Currently, flares are the final point of combustion for waste gases and minimal intervention is taken for environmental enhancement due to safety concerns. This flare system, as disclosed, improves the environmental performance, while at the same time, maintains the safety aspect of the flare network. The flare system will result in reduced sulfur oxide emissions with minimal costs.

Structured packing reduces the pressure drop and provides structural stability during emergency conditions. Height equivalent to a theoretical plate (HETP) can be packed to about 40 cm, therefore about 2 meters in height which is equivalent to four or five trays. More than 80% $H_2S$ can be absorbed around 90% of time. This reduces pollution considerably in most cases for refineries.

It is to be understood that the flare system and flare system method are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A flare seal drum having an amine liquid seal, the flare seal drum comprising:
   a baffle separating the flare seal drum into a first section and a second section;
   a waste gas inlet receiving waste gas into the first section and being combined with amine in the first section;
   a gas collecting pipe located in the first section;
   a packing pipe receiving waste gas from the gas collecting pipe;
   a packing filling the packing pipe, the waste gas passing through the packing;
   an amine spray nozzle located above the packing pipe and supplying amine to the packing in the packing pipe; and
   an amine pump that removes amine and waste gas from the second section through an amine line.

2. The flare seal drum as recited in claim 1, further comprising an inlet supplying amine to the first section.

3. The flare seal drum as recited in claim 1, further comprising a plurality of slots surrounding the gas collecting pipe.

4. The flare seal drum as recited in claim 1, further comprising a siphon located in the second section that drains amine from the second section.

5. The flare seal drum as recited in claim 1, further comprising a filter in the amine line that removes solid particles.

6. The flare seal drum as recited in claim 1, further comprising an amine regenerator in the amine line that removes waste gas and recycles the amine.

7. The flare seal drum as recited in claim 1, wherein a height of the packing is equivalent to four theoretical plates.

8. The flare seal drum as recited in claim 1, wherein a height of the packing is about 40 cm.

9. The flare seal drum as recited in claim 1, wherein the amine is selected from the group consisting of monoethanolamine (MEA), diethanolamine (DEA), methyl diethanolamine (MDEA), diisopropanolamine (DIPA), and any combination thereof.

10. A flare system method for a flare seal drum split into a first section and a second section, the method comprising:
    receiving waste gas in the first section from a waste gas inlet so that the waste gas combines with amine;
    collecting the waste gas in a gas collecting pipe located in the first section;
    allowing the waste gas in the gas collecting pipe to flow to a packing pipe filled with a packing, the waste gas flowing through the packing;
    spraying the packing with amine from an amine spray nozzle located above the packing pipe; and
    removing amine and waste gas from the second section through an amine line using an amine pump.

11. The method as recited in claim 10, further comprising supplying amine to the first section through an inlet.

12. The method as recited in claim 10, further comprising collecting waste gas through a plurality of slots surrounding the gas collection pipe.

13. The method as recited in claim 10, further comprising draining amine from the second section with a siphon located in the second section.

14. The method as recited in claim 10, further comprising removing solid particles from the amine line with a filter.

15. The method as recited in claim 10, further comprising removing waste gas and recycling amine in the amine line with an amine regenerator.

16. The method as recited in claim 10, wherein a height of the packing is equivalent to four theoretical plates.

17. The method as recited in claim 10, wherein the amine is selected from the group consisting of monoethanolamine (MEA), diethanolamine (DEA), methyl diethanolamine (MDEA), diisopropanolamine (DIPA), and any combination thereof.

* * * * *